UNITED STATES PATENT OFFICE.

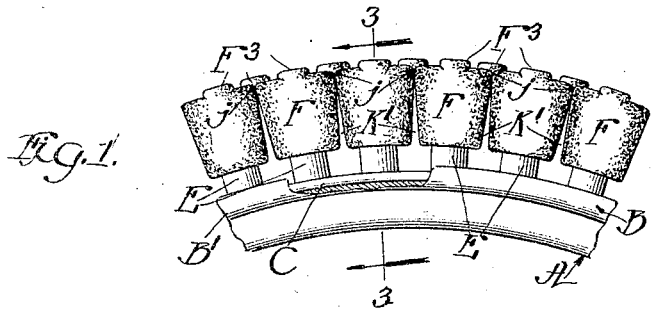
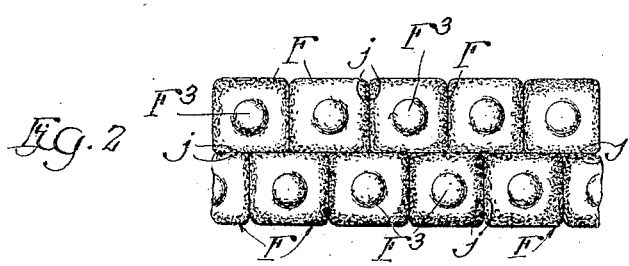
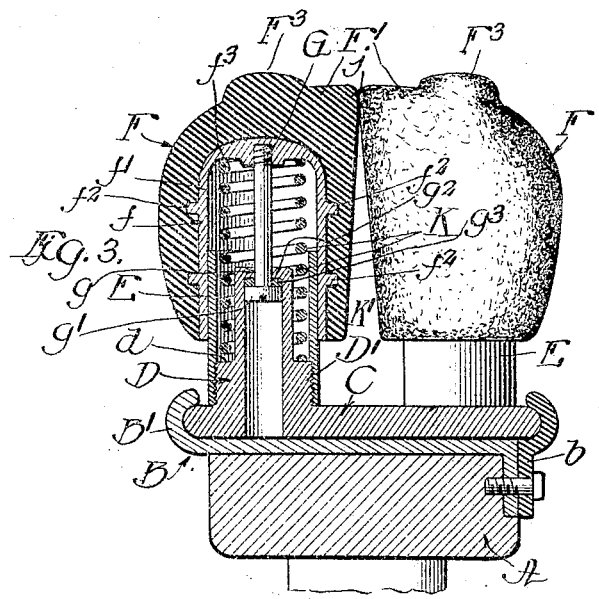
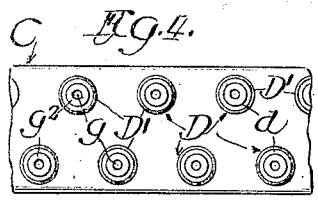

SEMPLE S. SCOTT, OF CHICAGO, ILLINOIS.

RESILIENT TIRE.

1,017,814.

Specification of Letters Patent.  Patented Feb. 20, 1912.

Application filed April 27, 1911.  Serial No. 623,728.

*To all whom it may concern:*

Be it known that I, SEMPLE S. SCOTT, a citizen of the United States, and a resident of Chicago, in the county of Cook and State of Illinois, have invented certain new and useful Improvements in Resilient Tires; and I do hereby declare that the following is a full, clear, and exact description thereof, reference being had to the accompanying drawings, and to the letters of reference marked thereon, which form a part of this specification.

This invention relates to an improvement in resilient tires, primarily intended for use with heavy trucks or wagons, and consists of the matters hereinafter described and more particularly pointed out in the appended claims.

In the drawings:—Figure 1 is a side elevation of a part of my improved tire. Fig. 2 is a view representing a top plan view of the same. Fig. 3 is a view representing a cross-section through the tire on an enlarged scale in a plane indicated by the line 3—3 of Fig. 1. Fig. 4 is a view representing a plan of the band or ring to which the tire members are secured.

My improved tire comprises an annular band adapted to be secured to the wheel rim and a plurality of independently yielding cushion tread members or blocks carried by said band and arranged in parallel rows extending circumferentially about the tread of the tire with the blocks of each row preferably in staggered relation with the blocks of the adjacent row. As shown herein, the tire has two circumferential rows of said tread members or blocks each yieldingly connected to a flat endless band mounted on the wheel rim.

Referring now to that embodiment of my invention illustrated in the drawings, A indicates a part of the felly of a wheel provided with my improved tire, and B a metallic clencher rim secured thereto. Said rim is made in two separable parts $B^1$, $b$, which are adapted to engage and retain on the wheel a flat, endless metal band C, to which the tread members or blocks comprising the tire, are yieldingly secured. Said band is provided with a plurality of spaced, radially-extending, elongated, tubular nipples D, preferably arranged in parallel rows extending circumferentially about said band (see Fig. 4), with each nipple of one row arranged opposite the space between the two adjacent nipples of the other row, that is to say, the nipples of one row are in staggered relation to the nipples of the adjacent row. On said nipples are mounted a plurality of tread members or blocks F, the outer ends of which together constitute the tread of the tire and each of which is yieldingly mounted on an associated nipple so as to be capable of independent yielding movement in a radial direction toward said band. Each of said nipples D has a threaded base $D^1$ to receive the lower, internally threaded end of a tubular sleeve E. Said nipple is reduced in diameter above the base $D^1$ to provide a shoulder $d$ and an annular space within the sleeve above said shoulder for the reception of a coiled spring K which surrounds the reduced end of the nipple. The tire members F are preferably made of elastic yielding material, such as rubber, and are in the form of inverted cups. Within each cup is rigidly secured an inverted metallic cup $f$ having a tubular side wall $f^1$ which embraces and has telescoping relation with an associated tubular sleeve E. As shown herein the metallic cup $f$ is provided on its outer wall with spaced annular shoulders $f^2$, which are embedded in the inner wall of the rubber cup comprising the tire member F, whereby the metallic cup is rigidly connected with said elastic rubber cup. A coiled spring K rests upon the shoulder $d$ at its lower end and bears at its upper end against the inside of the top wall $f^3$ of the metallic cup $f$. Within the nipple D is located the head $g^1$ of a radially extending bolt G which projects through an aperture $g$ in an integral reducing cap $g^2$ on the outer end of said nipple, and has threaded engagement with the top wall $f^3$ of the said metallic cup. The springs K normally hold the tread members F in their outermost radial position, the outward movement of said tread members being limited by the engagement of the heads $g^1$ of the bolts G against the reducing caps $g^2$ on the outer ends of the nipples. Preferably hard metal washers $g^3$ are interposed between the heads of the bolts and the reducing caps of the nipples to prevent wear of said caps.

From the construction described it is apparent that each tread member or block is adapted to yield in a radial direction toward the wheel rim, the side wall of the metallic cup $f$ sliding in telescoping relation on the associated tubular sleeve E against the outward pressure of the spring K which provides a cushion and acts to restore the tread member to its normal position after the pressure on said tread member has ceased.

The outer ends F¹ of the tread members F are preferably made of such relative cross-sectional shape and area that together they constitute a continuous, substantially flat tread. As shown herein said ends are substantially square and are of like superficial area and the end of each block has its lateral marginal edges j engaged with the lateral marginal edges of the adjacent blocks. The adjacent walls of adjacent blocks are inclined away from one another to provide a space K¹ between the block bodies. Any mud, gravel or small pieces of stone that are forced between the engaging edges of the block ends are thus enabled to work between the blocks toward the band C from which they will readily pass laterally from the tire through the spaces between the tubular sleeves E.

By arranging the metallic cups f so as to embrace the tubular sleeves on which they slide, gravel, mud, sand or the like are prevented from entering between the walls of the relatively movable parts and producing wear or passing into the interior of the cups there to clog or obstruct the operation of the springs. Each time the blocks are subjected to pressure and caused to yield toward the wheel rim any gravel, mud, sand or the like which may collect on and stick to the outer surfaces of the sleeves E will be scraped off and thus removed by the end of the cup wall.

It will be apparent that while my improved tire presents a continuous tread, any part of this tread is adapted to yield, when a stone or other obstruction engages it, independently of the other parts of the tread, the action of my tire in this respect approximating the action of a pneumatic tire. Preferably the outer end of each block is provided with a rounded boss F³ to prevent skidding.

I claim as my invention:—

1. A tire consisting of a plurality of circumferential rows of radially extending blocks, means for supporting said blocks so that each may yield independently in a radial direction toward the tire center, said blocks having outer ends which together constitute the tread of the tire, each block having the edges of its outer end located closely adjacent to the edges of the outer ends of the adjacent blocks in its own row and in the adjacent row, and the adjacent sides of adjacent blocks being inclined away from each other toward the tire center.

2. A tire consisting of a plurality of radially extending, annularly arranged blocks, the outer ends of which together constitute the tread of said tire, an annular band located radially within said annular row of blocks, each block being provided with a radially extending cup-like recess opening through its inner end, a metallic tube secured within said cup-shaped recess, a sleeve rigidly secured to said band and extending within said tube, said tube and sleeve having sliding relation with each other, resilient means located within said sleeve adapted to resist the movement of said block toward said band and means connecting said band and said block adapted to limit the radial movement of said block away from said band.

3. A tire consisting of a plurality of radially extending, annularly arranged blocks, the outer ends of which together constitute the tread of said tire, an annular band located radially within said annular row of blocks, and means for yieldingly connecting each of said blocks to said band comprising a radially extending tubular nipple made rigid with said band and provided with an apertured reducing cap at its outer end, said nipple having a base of larger diameter than its outer end, a radially extending sleeve rigidly secured to said nipple base, each of said blocks having a cup-shaped recess opening through its inner end, a metallic inverted cup rigidly secured within the recess of said block, said sleeve extending within said cup and having telescoping relation with the side walls thereof, a bolt having a head slidably mounted within said nipple, said bolt projecting through the aperture in the said reducing cap and having its end threaded into the bottom of said metallic cup, and a coiled spring interposed between the bottom of said metallic cup and the base of said nipple.

In testimony, that I claim the foregoing as my invention I affix my signature in the presence of two witnesses, this 24th day of April A. D. 1911.

SEMPLE S. SCOTT.

Witnesses:
GEORGE R. WILKINS.
T. H. ALFREDS.